Nov. 18, 1969   T. W. CARLSON ET AL   3,479,596

LINEAR METER MOVEMENTS

Filed Sept. 12, 1966

INVENTORS.
THOMAS W. CARLSON
JOHN R. IVERS
BY Charles P. Ingemach
ATTORNEY

United States Patent Office

3,479,596
Patented Nov. 18, 1969

1

3,479,596
LINEAR METER MOVEMENTS
Thomas W. Carlson, St. Paul, and John R. Ivers, Fridley, Minn., assignors to Honeywell, Inc., Minneapolis, Minn., a corporation of Delaware
Filed Sept. 12, 1966, Ser. No. 578,526
Int. Cl. G01r 5/06
U.S. Cl. 324—151        4 Claims

ABSTRACT OF THE DISCLOSURE

A meter movement with two coil assemblies which move linearly within a magnetic field. The coil assemblies are tied together with ribbon-like wires and pulleys in a counterbalanced configuration; the wires also serving to conduct current to the coils. One of the coil assemblies is connected to a feedback potentiometer which develops a signal used to null the input signal to the meter.

---

The subject of this invention is generally related to electric meter movements and is particularly directed to a linear meter movement which is similar to a D'Arsonval movement and its basic operating principles except that it has certain structural and special operating features which are not found in the conventional D'Arsonval movement.

The meter movement comprises two moving coil assemblies which move linearly within a magnetic field and are connected together to provide a counterbalanced system which will operate well under high acceleration and vibration. In addition a feedback potentiometer develops an electrical signal which is used to null the input signal, i.e., the system operates as a closed loop electrical servo system, thereby providing additional stability in high acceleration and vibration environments. The coil assemblies are mounted on low friction linear ball bushings or equivalents. One coil assembly has attached thereto a pointer and the potentiometer wiper arm and the other coil assembly acts as a counterbalance with respect to the first coil assembly. The coil assemblies are tied together by thin ribbon-like wires supported by low friction ball bearing pulleys. Power or current to the coil assemblies is supplied through the supporting wires and they can also be used to conduct a signal developed at the potentiometer wiper arm. The magnetic flux or field for the moving coils is supplied by a bar magnet and confined within four pole pieces. This system is superior to present vertical meters which rotate around a pivot point as it eliminates the requirement for a curved dial surface which in turn requires an expensive often non-reflective curved piece of glass. In addition the pointer is visible from all angles. It is cheaper, more rugged, and less intricate than tape indicators.

Figure 1:
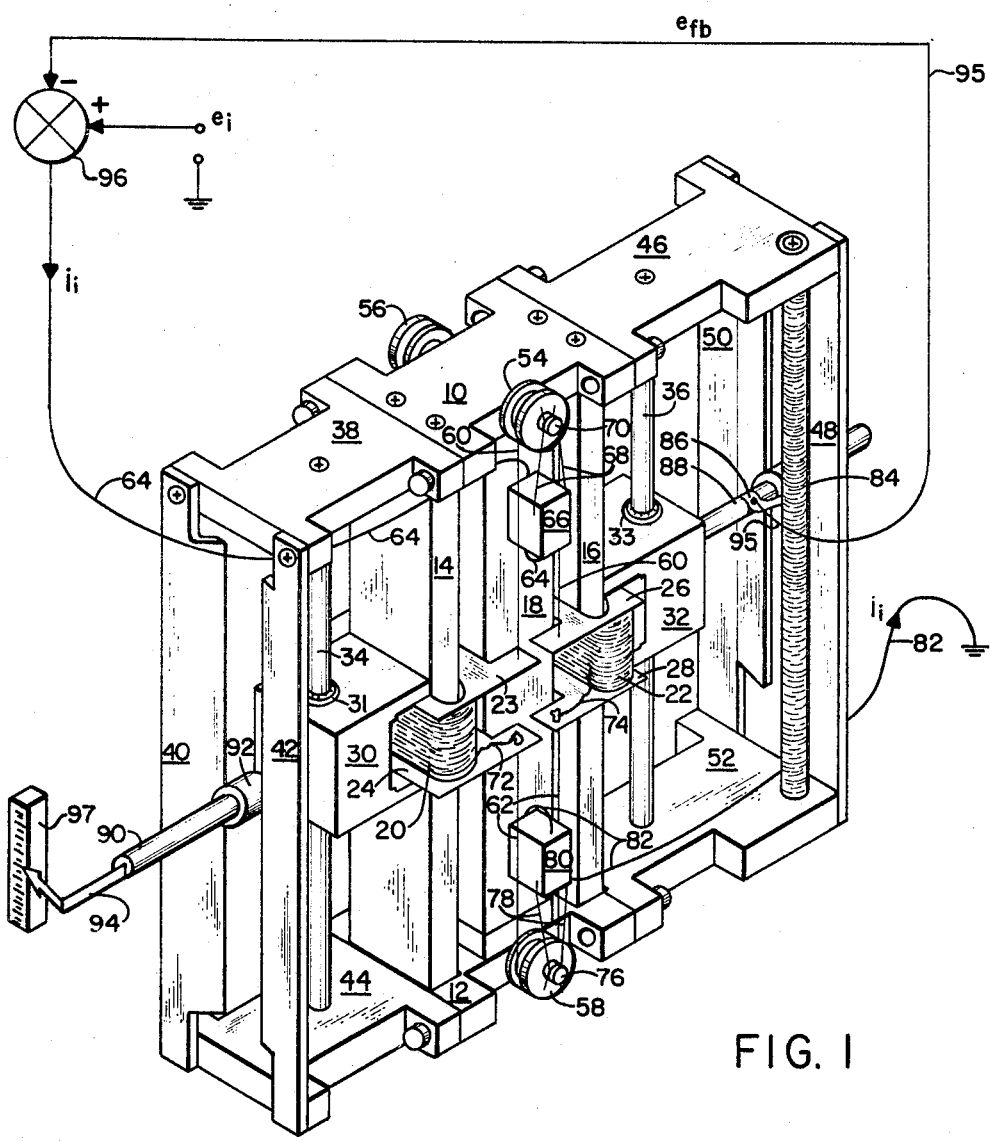

The nature of the invention and the distinguishing features and advantages thereof will be clearly understood from the following detailed description and the accompanying drawings in which:

FIGURE 1 is a view of the meter movement in perspective; and

2

Figure 2:
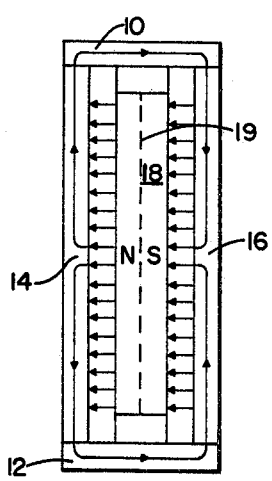

FIGURE 2 is a schematic diagram illustrating the magnetic circuit of FIGURE 1.

In the meter movement of FIGURE 1, bar-like members 10, 12, 14, and 16 form a closed structure. Members 10 and 12 form the top and bottom respectively of the closed structure and members 14 and 16 form the left and right sides respectively of the closed structure. Members 14 and 16 are shown mutually parallel and members 10 and 12 which are shown at right angles to members 14 and 16 are also shown mutually parallel. A bar magnet 18 is affixed between members 10 and 12 and is shown equally spaced from and parallel to members 14 and 16. Bar magnet 18 is divided into north and south poles by a longitudinal plane parallel to members 14 and 16. This plane is shown as dashed line 19 in FIGURE 2.

FIGURE 2 clearly illustrates the configuration of the magnetic field produced by magnet 18 and formed by the closed structure comprising members 10, 12, 14, and 16. The magnetic lines of force, or flux, produced by magnet 18 may take one of two general paths. The first path is from the north pole, or left face of bar magnet 18, through the space between magnet 18 and member 14, up member 14, across to the right in member 10, down through member 16, and through the space between member 16 and the south pole, or right face, of bar magnet 18. The second general path is out the north pole of magnet 18 to member 14, down through member 14 to member 12, across to the right in member 12 to member 16, and up member 16 and across the space between member 16 and the south pole of magnet 18. Bar magnet 18 in conjunction with the closed structure comprised of members 10, 12, 14 and 16 produces a uniform field in the spaces between magnet 18 and side members 14 and 16.

Windings 20 and 22 are wound on assemblies which in each case include a pair of guides. Guides 23 and 24 are associated with winding 20 and guides 26 and 28 are associated with winding 22. The guides may be made of insulating material such as Teflon and prevent movement of coils when they are subjected to large shocks or vibrations. Guides 23 and 24 associated with winding 20 are affixed to a mounting block 30 through which there is inserted a ball bearing bushing 31. Bushing 31 slides along a shaft 34 with very little friction. Shaft 34 is mounted by means of a structure including members 38, 40, 42, and 44. Shaft 34 is attached directly to members 38 and 44 which are connected to members 10 and 12 respectively. Members 38 and 44 are shown co-planar with members 10 and 12 respectively. Members 40 and 42 are connected between members 38 and 44 and are shown parallel to member 14 and shaft 34. Thus coil or winding 20 is mounted to slide up and down along member 14, member 14 passing through the middle or center of coil 20.

In the same way guides 26 and 28 associated with winding 22 are affixed to mounting block 32 which has inserted therein a bushing 33 which coacts with a shaft 36. Shaft 36 is supported by means of a structure which includes members 46, 48, 50, and 52. Members 46 and 52 are shown co-planar with and connected to members 10 and 12 respectively. Members 50 and 48 are connected between members 46 and 52 and are shown parallel with shaft 36 and member 16. Thus coil 22 can slide up and down along member 16 with member 16 passing through the middle or center of coil 22.

Mounted on opposing edges of member 10 are a pair of ball bearing pulleys 54 and 56 and mounted on corresponding edges of member 12 are a second pair of pulleys 58 and another which is not visible. A thin ribbon-like wire 60 cooperates with pulley 54 and is attached at its ends to corresponding points on guides 23 and 26 respectively. A second thin ribbon-like wire 62 cooperates with pulley 58 and is connected at its ends to corresponding points on guides 24 and 28 respectively. A third wire not shown or numbered cooperates with pulley 56 and is connected at its ends to guides 22 and 26 respectively in the same fashion as wire 60. In addition a fourth wire coacts with a fourth pulley, not shown, in a manner analogous to wire 62. Thus windings 20 and 22 act to counterbalance each other, thereby providing resistance to vibration, acceleration, and shocks.

Wires 60 and 62 form part of the path through which current is applied to coils 20 and 22. For this purpose, although it is not visible, one lead of coil 20 is electrically connected at the underside of guide 23 to that end of wire 60 which is connected to guide 23. In the same way one of the ends of winding 22 is electrically connected to that end of wire 60 which is connected to guide 26. In the same way lead 72 of coil 20 and lead 74 of coil 22 are electrically connected to those ends of wire 62 which are connected to guides 24 and 28 respectively. Hence wires 60 and 62 perform a dual function, that of conducting current to coils 20 and 22 and acting to allow coils 20 and 22 to counterbalance each other. Signal current, $i_i$, to the coils is injected through a lead 64 to a terminal mounting block 66 attached to magnet 18. The current present at block 66 is conducted through a pair of flex leads 68 attached thereto which coact with a projection 70 on pulley 54. Projection 70 acts as a slip ring and flex leads 68 are analogous to brushes. Thus current is conducted to pulley 54 and from pulley 54 down the left side and right side of wire 60 to coils 20 and 22 respectively. The current flows through coils 20 and 22 and out leads 72 and 74 respectively and down the left and right sides of wire 62 respectively to pulley 58. From pulley 58 the current flows to a projection 76 on pulley 58 which acts as another slip ring which coacts with a pair of flex leads 78 which are mounted on a terminal mounting block 80 which in turn is attached to magnet 18. In this way current at pulley 58 is conducted through flex leads 78 to terminal block 80 and out a lead 82. In this way current flows through coils 20 and 22 when a source of signal current, not shown, is connected between leads 82 and 64. Although the coils as herein described are in parallel it is not necessary that they be connected in parallel and they can be connected in series if desired. If a series connection is desired three wires rather than two would have to be utilized. For example wire 60 might be used to bring current into coil 22, wire 62 would be used to conduct the series current from coil 22 to coil 20 and a third wire, for example the one coacting with pulley 56, would be used to return the series current.

A flat resistance winding 84 is shown connected between members 46 and 52 and is parallel with member 16. Coacting with resistance winding 84 is a wiper 86 which is mounted on a rod 88 which is attached or connected to mounting block 32. Rod 88 is shown perpendicular to shaft 36. Under normal operating conditions a source of DC voltage would be connected across winding 84 and a potential would exist at wiper 86 which is proportional to the position of the wiper 86 on resistance winding 84. A voltage, $e_{fb}$ developed at wiper 86 is fed back to null an input voltage $e_i$, the signal current $i_i$ being applied to coils 20 and 22 therefore also being nulled. Assuming that the coils 20 and 22 are connected in parallel the voltage developed at wiper 86 can be brought out through one of the wires analogous to wires 60 and 62 on the opposing side of the meter movement of FIGURE 1.

A rod 90 is shown connected to mounting block 30 perpendicular to shaft 34 and is restricted in its sideways movement by a section 92 which moves up and down within a vertical slot formed by members 40 and 42. A pointer 94 is attached to the outside end of rod 90. Pointer 94 cooperates with a scale which is not shown. In the same manner rod 88 is restricted in its sideways movement by the slot formed by members 48 and 50.

In operation a source of current is inserted between the ends of leads 64 and 82, and flows through coils 20 and 22 in parallel paths. The current flowing in coils 20 and 22 coacts with the magnetic field in the spaces between magnet 18 and vertical members 14 and 16 respectively. Only the current in the interior legs of coils 20 and 22 react with the magnetic field. The current in the exterior legs of coils 20 and 22 does not coact with the magnetic field as the magnetic field is substantially confined between the vertical members 14 and 16 and magnet 18. Coils 20 and 22 are wound such that the current in coil 20 reacts with the field in the space between magnet 18 and 14 in such a way that the force generated due to this reaction is in an opposite direction to that produced by the current in winding 22 which reacts with the field between magnet 18 and vertical member 16. This can be accomplished for example by winding coils 20 and 22 in opposite directions. Thus the forces generated at windings 20 and 22 are in series and are aiding. That is, for example, if the force on coil 20 is directed downward the force on coil 22 is directed upward. In this case rod 88, which is attached to mounting block 32 and the wiper 86 mounted thereon which cooperates with the resistance 84 will move upward until the voltage picked off at the wiper 86, $e_{fb}$, is of such a value that when it is fed back to a differential device 96, for example on lead 95, it nulls the input voltage $e_i$ and thus the signal current $i_i$, at which time coils 20 and 22 will cease moving. This condition will be maintained until the signal current $i_i$ either increases or decreases from its original value. Furthermore pointer 94 would move in a downward direction and in conjunction with a scale 97 will indicate the signal current which was applied through leads 64 and 82. Reversing the direction of the input signal current reverses the movements of the respective coils.

It is to be understood that the arrangement described above is merely illustrative of the application of the principles of the invention. Other arrangements may be devised by those skilled in the art without departing from the spirit and scope of the invention.

What is claimed is:

1. A meter movement comprising, in combination:
  top, bottom, left and right members of low reluctance, joined together to form a closed structure;
  a magnet mounted within said closed structure, equally spaced from the left and right members, said magnet producing fields of magnetic flux in the spaces between the magnet and the left and right members respectively, the closed structure formed by the members providing a pair of paths for the magnetic flux produced by said magnet;
  first and second windings mounted for movement along the left and right members respectively, the members running through the middle of said windings;
  means mechanically connecting said first and second windings so that they mutually counterbalance each other;
  means for conducting current to and from said first and second windings to cause movement in opposite directions,
  a resistor mounted adjacent one of said members;
  a wiper mounted to move with one of said windings and cooperating with said resistor; and a pointer mounted to move with one of said windings and cooperate with an indicator card.

2. The apparatus of claim 1 wherein the means connecting the windings so that they counterbalance each other comprises a set of pulleys mounted on the closed structure and ribbon-like wires connected to the windings and running over the pulleys.

3. The apparatus of claim 1 wherein the left and right members are parallel, the magnet is a bar magnet mounted parallel to the left and right members, a uniform field is produced in the spaces between the magnet and the left and right members, and the movement of said windings is linear and opposed.

4. The apparatus of claim 1 wherein the means for conducting current to and from said first and second windings includes the means connecting the windings.

References Cited

UNITED STATES PATENTS

| 575,699 | 1/1897 | Chaplin et al. | |
| 2,551,585 | 5/1951 | Curran | 324—145 X |
| 2,696,586 | 12/1954 | Lockyer | 323—84 X |
| 2,734,975 | 2/1956 | Goss | 324—99 X |

FOREIGN PATENTS

| 990,957 | 9/1951 | France. |

RUDOLPH V. ROLINEC, Primary Examiner

JERALD J. DEVITT, Assistant Examiner

U.S. Cl. X.R.

324—125; 335—222